United States Patent [19]

Giddey et al.

[11] Patent Number: 4,818,554

[45] Date of Patent: Apr. 4, 1989

[54] AERATED FOOD PRODUCT BASED ON RAW MILK AND METHOD FOR ITS PREPARATION

[75] Inventors: Claude Giddey, Geneva; Georges Dove, Carouge, both of Switzerland

[73] Assignee: Jacobs-Suchard-A.G., Zurich, Switzerland

[21] Appl. No.: 46,695

[22] Filed: May 7, 1987

[30] Foreign Application Priority Data

May 16, 1986 [CH] Switzerland ............... 1995/86

[51] Int. Cl.$^4$ ............... A23G 3/00; A23C 9/154
[52] U.S. Cl. ............... 426/564; 426/613; 426/572; 426/587; 426/565; 426/330.2
[58] Field of Search ............... 426/564, 570, 571, 572, 426/565, 587, 330.2, 613

[56] References Cited

U.S. PATENT DOCUMENTS

| | | | |
|---|---|---|---|
| 2,883,286 | 4/1959 | Musser | 426/570 |
| 2,987,400 | 6/1931 | Hunter . | |
| 3,674,507 | 7/1972 | Carasso . | |
| 3,968,267 | 7/1976 | Ogasa et al. | 426/570 |
| 4,282,262 | 8/1981 | Blake . | |
| 4,298,625 | 11/1981 | Cillario | 426/572 |
| 4,410,555 | 10/1983 | Richardson | 426/572 |
| 4,478,867 | 10/1984 | Zobel | 426/572 |
| 4,668,520 | 5/1987 | Okonoji et al. | 426/572 |

FOREIGN PATENT DOCUMENTS

| | | |
|---|---|---|
| 2811356 | 9/1979 | Fed. Rep. of Germany . |
| 3031254 | 4/1983 | Fed. Rep. of Germany . |
| 3117940 | 8/1983 | Fed. Rep. of Germany . |
| 2118757 | 7/1972 | France . |
| 2473269 | 7/1981 | France . |
| 2541870 | 9/1984 | France . |
| 2057848 | 4/1981 | United Kingdom . |

OTHER PUBLICATIONS

International Search Report No. CH 1995/86 (SN 8746) of Batelle Memorial Institute.
Listing of Related Abstracts.

*Primary Examiner*—Jeanette Hunter
*Attorney, Agent, or Firm*—Burns, Doane, Swecker & Mathis

[57] ABSTRACT

Milk foodproduct in the form of a foam obtained by whipping air or a gas into it so that its density is below 0.75. This foam contains raw milk which has been subjected to reduced pressure evaporation, plus preserving agents, gellifying agents, flavoring agents and foaming agents.

20 Claims, No Drawings

AERATED FOOD PRODUCT BASED ON RAW MILK AND METHOD FOR ITS PREPARATION

The present invention relates to an aerated food product based on new milk and to the preparation of this product. This product has a foamy, consistent and homogeneous structure reminding of nougat but of softer consistency; it is constituted by a dispersion of microbubbles of air (or of an inert gas) in a mass of uncooked milk from which some of the water has been removed during manufacture. Because of this, the product under discussion was labelled hereafter under the definition of "fresh milk foam".

It should be noted that such definition of the present product excludes the presence of ordinary concentrated milk. Indeed, in view of its manufacturing conditions, concentrated milk is not suitable for the product of the invention because of flavor, consistency and color problems.

The concept of expanded foodstuffs prepared from milk products is not new. Thus, document No. FR-A-2.133.293 (LAITERIES BRIDEL) discloses an expanded milk product resulting from the low temperature whipping of milk containing rennet to obtain a "mousse" of density 0.25–0.55. The milk can be of the concentrated type and it can be innoculated with a Pennicilium type microorganism to provide a cheese.

Document No. FR-A-2.180.014 (UNILEVER) concerns a method of preparation of aerated, viscous, pasteurized milk products based on cottage cheese and yoghurt.

Document No. EP-A-59.617 (MERCK) discloses a milk-shake containing yoghurt and milk in a weight ratio of 80-53/20-47; this milk-shake contains a foaming agent derived from soja proteins (0.5–2.5%), carboxymethylcellulose and gum xanthan. The storage stability time of the expanded structure of this product in the aerated whipped state is on the order of a half-hour.

French Patent No. FR-A-2.541.870 (CENTRALE LAITIERE DE HAUTE NORMANDIE) describes a method to stabilize a solid food-stuff with a residual humidity content, as well as the products obtained from this method. This method is characterized in forming a particulate constituents mixture in which the protide constituent comprises milk proteins from which the residual lactose is substantially totally hydrolyzed and the lipids have a melting point high enough to be used to embed the particles, while remaining solid at the elevated temperatures of subsequent treatments; introducing said particulate mixture, at a temperature below that of the melting point of the lipids, into an aqueous phase constituted by a foam containing essentially glucides and at least one agent which allows mechanical whipping to take place in aqueous medium at this temperature, while effecting stabilization of the foam obtained, the latter being sufficiently flexible to enable the mixture of particulate constituents to be introduced therein without disturbing the air bubbles of the foam, said method leading to a doughy product containing at least 10% of moisture and, generally, between 10 and 20% of moisture (i.e. a density of 0.8 to 0.9).

Document No. FR-A-2.473.269 (FERRERO) describes a sugared foamy protein foodstuff containing partially skimmed sweetened concentrated milk. This product is constituted by an "oil-in-water" emulsion containing edible fats, milk protein and sugars, with the pH of natural milk (6.2–7.5). This product can be obtained from a fatty phase of an edible fat and an aqueous phase of partially skimmed, sugared, concentrated milk with a viscosity of 2000 to 6000 cP at 20° C. and of which the viscosity variation with temperature at 40° C., after heating to 80° C. and cooling to 40° C., ($\Delta V$ on the drawing) does not exceed 1500 cP; with a particularly suitable milk having a protein ratio casein/lactoprotein of 2.8:1 to 3.2:1, the emulsion has a water content of 17–35% and a physical and chemical stability lasting several months.

However, none of the thinned food products described above corresponds to the "fresh milk foam" of the present invention whose definition is given in annexed claim 1.

It should be remembered that the water activity $a_w$ is related to the storage capacity of the foodstuffs, i.e. to the resistance to microorganism attack. The value of $a_w$ is given by the following ratio: $NH_2O/(Nd+NH_2O)$ where Nd is the total number of moles (of all the various substances) dissolved in the foodstuff and $NH_2O$ the corresponding number of moles of water. The figure $a_w$ can also be defined as the following ratio: $P_1H_2O/P-H_2O$ where the dividend represents the water vapor pressure in the foodstuff and the divisor is the vapor pressure of pure water at the same temperature.

As sweetener and preservative additive (B), there can be used mono and polysaccharides such as glucose, galactose, fructose, sucrose, maltose, or lactose, as well as the oligosaccharides which result from the degradation of polysaccharides and other carbohydrates (starch, cellulose, dextrin, maltodextrin, etc.). These carbohydrates can be used in the form of their natural extracts, for instance corn syrup, glucose syrup, molasses, honey, etc. As for the polyols, the following can be cited, e.g. hydrogenated sugars like sorbitol, maltitol, xylitol, etc., as well as polyalcohols such as glycerin, propylene glycol and other similar edible compounds usable in foodstuffs. Moreover, the present foam can also contain mineral salts such as sorbates, citrates, tartrates, gluconates, lactates, acetates and other salts of sodium or potassium.

The proportion of the sweetener additives to be used in the product of the invention should be sufficient to ensure preservation, i.e. to contribute (together with the other dissolved ingredients) to provide a water activity not exceeding 0.80, preferably below this value. The quantity of these additives should also be adapted in function to their inherent sweetening power so as to provide a pleasant sweet taste to the foodstuff. Consequently, the concentration of these additives can be varied according to their sweetening ability, their molecular-weight and to the taste to be given to the completed foodstuff. Generally, the sugar content of the present foodstuff is preferably comprised between 50 and 75%, but these limits can be exceeded in special cases.

When mineral salts are used, the proportions thereof to be used are preferably around 0.1 to 2% by weight.

The present foodstuff comprises, as the ingredient (C), one or more gelling and stabilizing polymers capable of inhibiting syneresis phenomena, i.e. separation from the mass on storage of a fraction of the water contained therein. The following polymers are usable as such: gelatin, carrageenates, alginates, agar, pectin, dextran, xanthan and other gums with viscous and gellifing properties. The amount of such polymers or mixtures of polymers will preferably be, about 0.2 to 3% by weight; however in special cases, these limits can be overrun on both sides of the range.

The present foodstuff further contains a foaming agent which, upon whipping in the presence of air (or another gas) provides a foam. This foam, when blended with the remaining ingredients, provides to the foodstuff its final aerated structure. As the foaming agent, one will preferably use an aqueous albumin solution, although other foaming agents, e.g. certain vegetal proteins which are known to act as foamers (soya proteins, HYFOAMA, etc.) are also suitable in some cases. Egg albumin is advantageous because it imparts an excellent stability to the desired foam foodstuff, this stability being due to a coagulation of the whipped albumin during foam preparation as disclosed hereafter. In general, it is advantageous to use from about 0.5 to 5% by weight of albumin.

The present thinned foodstuff further contains one or more flavoring ingredients capable of imparting a distinctive organoleptic character to the "fresh milk foam". The following flavors or flavoring compositions can be used among others: cocoa, chocolate, coffee, toffee, fruits of various kinds (in the form of extracts, marmalades, fresh or regenerated fruits, etc.) various spirits such as rum, cherry, whiskey, brandy, gin, etc., ground and milled almonds or nuts, spices and others. The amount of such flavoring compositions is extremely variable and may depend on the end-use of the foam, namely chocolate making (filling candies), confectionery or for making cookies, cakes, tarts, pies, etc. In general, quantities of the order of 0.5 to 10% by weight of such flavoring compositions can be used depending on their kind and their concentration, but these limits are not critical and can be overrun according to the needs.

The milk used in the present foodstuff can be whole milk or partially or totally skimmed milk. If skimmed milk is used, it is possible to subsequently add into the foodstuff (i.e. after foaming) additional fats, namely cream, milk fats, cocoa butter and the like.

For preparing the foodstuff of the invention, the method defined in claim 9 is used. It is important to note that the step at which the foaming agent (E) is whipped depend in some respects of the starting milk composition, i.e. whether the original milk fat has been, or not, removed beforehand by skimming. Indeed, if fatty substances are present in the intermediate blend of ingredients (A), (B), (C) and (E), it cannot be foamed by whipping. In this case, the foaming agent solution must be foamed separately and the foam is incorporated into the blend of the other components. This separate whipping is not necessary in the other case and a possible method is to directly whip the mixture of ingredients (A), (B), (C) and (E), the flavoring agent (D) being added before whipping if it contains no fat, or after whipping in the opposite case. These several variants are specified in claims 12 to 14. It is evident that when the mixture is foamed in bulk (i.e. when the mixture contains no fat), it is possible to subsequently incorporate to the foam fatty substances such as butter, cream, cocoa butter, etc.

Regarding the several handling operations to be applied which constitute the preparation method of the invention, the following points should be noted:

Besides the optional milk skimming and pasteurization operations which are conventional and need not be developed here, the other operations should be carefully conducted and under well controlled conditions so as to avoid overheating the ingredients and the occurrence of off-flavors (taste of concentrated milk) which interfere with the quality of the preparation. Inter alia, the preliminary evaporation (I) should be preformed under the lowest possible pressure (although in conformity with the requirements of an industrial method), i.e. preferably under 1-10 Torr. Under such reduced pressures, the evaporation temperature does not exceed 50° C. and is preferably maintained below this limit, i.e. between 30° and 40° C. The amount of water eliminated during this step is variable and depends on the properties and the consistency to be imparted to the final product. In general, an amount of water corresponding to about 70-90% of the water originally present in the solution of milk and sugar is removed.

The addition of polymer (C) is effected at a temperature sufficient to ensure that it dissolves rapidly and homogeneously, but not too high however, for the same reasons explained before. In general, temperatures of the order of 50°-80° C. are convenient, preferably around 70° C.

The temperature at which the flavoring agent (D) is added depends on the nature thereof. When the product is sensitive to heat (spirits, coffee, etc.) too much heat is to be avoided (or, more exactly, heating for too long a time must be avoided); thus, when this is possible, for converting the blend into foam, to beat the blend in bulk (which operation is normally performed at a temperature sufficient to promote albumin coagulation, i.e. about 50°-80° C.), this is brought about as quickly as possible. In general, whipping is performed in a classical apparatus (for instance a HOBART whipper) and, as soon as beating is being started, the heat source is withdrawn. Consequently, because of the violent agitation involved in whipping (which operation lasts about 2-10 min), the mixture undergoes a fast cooling effect and, when beating is complete, the temperature reaches room-temperature, i.e. about 20°-30° C.

When the flavoring agent contains too much fat to be incorporated before whipping or, when the milk contains fatty substances (full-cream milk), it becomes necessary, as mentioned before, to whip the foaming agent separately and to incorporate the foam obtained to the remaining ingredients. This operation requires care not to break the foam. In this case, it is possible to blend into the thinned foodstuff the missing ingredients, namely the flavoring agent and, if desired, additional fatty substances.

For incorporating the albumin foam into the remaining foodstuff, care must be exercised, preferably by stirring slowly with a large spatula; the operation is preferably carried out at room temperature and heat is applied afterwards to congulate the albumin.

It is also possible, for incorporating the whipped foamed albumin to the remaining ingredients, to use a "static" blender consisting of a flow tube provided with baffles. The albumin foam (m), on one hand, and the solution of the remaining ingredients (s), on the other hand, are formed into separate streams which are brought side by side, at the required temperature, into this tube. By means of the baffles, the streams m and s are successively contacted together, then separated crosswise to their interface into new streams, and so on, until a homogeneous mass is obtained at the output of the "static" blender. This technique is summarized in claim 15.

The following Examples illustrate the invention in more details.

EXAMPLE 1

1.125 l (1.151 g) of raw skimmed milk containing 56.25 g of lactose, 37.12 g of proteins and 1012.5 g of water was used. A glucose syrup containing 566.7 g of solids and 242.9 g of water (ISOSWEET AMYLUM N.V., Holland) was added. The solution was evaporated under reduced pressure (40° C./10 Torr) to eliminate 1050 g of $H_2O$ (residue 890 g); the concentrated solution contained, by weight: 69,99% of sugars; 4.17% of proteins and 23.7% of water.

In a fraction of this solution (86.8 g) were mixed, at 70°-80° C., 1 g of gelatin and 0.2 g of slow pectin (origin, GEWO).

After dissolving the gellifying polymers, the temperature was raised to 80° C., a solution of 1 g of egg-albumin in 4 ml of water was added and the blend was whipped for 5 min in air in a HOBART whipper (not heated). The temperature dropped to about 30° C. and a homogeneous foam of density 0.7 was obtained. A mixture of 3 g of cocoa and 4 g of anhydrous butter was then added at 30° C. which provided a cocoa flavored, stable and homogeneous foam of density 0.75.

This product was qualified as excellent by professional tasters; it is perfectly stable under storage; it has a firm consistency and it was used to fill chocolate confection candies.

It should be noted that this product can be supplemented by the addition of spirits, e.g. brandy or whiskey to be added as a solution with butter and cocoa.

To 91.65 g of this concentrate were added successively at 70° C., gelatin 0.4 g SATIAGUM (an edible gum sold by CECA) 0.3 g, sodium citrate 0.15 g. After cooling to 50° C., 2.5 g of instant coffee (T. M. MAXWELL HOUSE) were further added.

On the other hand, a 20% by weight aqueous solution of powdered egg-white was foamed by whipping according to usual means.

Five g of this egg-white foam were carefully blended with the previous solution heated to 50° C. This blending was performed in about one minute, during which time the mass temperature went to 30° C. A coffee flavored fresh milk foam was therefore obtained of density 0.75 and containing, by weight: carbohydrates 62.27%; water 25.62%, proteins 4.7%, fats 4.59%.

This foam was perfectly storage-stable and of excellent taste; it was used as filler for chocolate confectionery fondants.

Example 3

The procedure was that of Example 1, starting from various sweetened, evaporated skimmed milks (see the concentrations in Table 1 hereafter). In each experiment, the following ingredients were used in 100 g of mixture: gelatin 1.4 g; slow pectin 0.2 g; 20% aqueous egg-albumin solution as the foaming agent 5 g.

Table 1 hereafter summarizes the various parameters such as sugar, water and protein weight content of the evaporated milk, kind and % by weight of the flavoring agent and density of the foam in kg/liter.

TABLE 1

| Exp. No. | Evaporated milk content in (g) | | | | flavour (g) | foam | | | |
|---|---|---|---|---|---|---|---|---|---|
| | (g) | sugar | water | proteins | | d | sugar | water | proteins |
| 1 | 90.4 | 61.9 | 21.4 | 3.7 | Black chocolate (3) | 0.64 | 63.4 | 25.4 | 5.7 |
| 2 | 88.4 | 60.5 | 20.9 | 3.6 | Apricots preserve (5) | 0.6 | 63.8 | 26.5 | 5.7 |
| 3 | 90.4 | 61.9 | 21.4 | 3.7 | Hazel nut paste (3) | 0.6 | 62 | 25.4 | 5.8 |
| 4 | 83.4 | 57.1 | 19.8 | 3.4 | Orange marmelade (10) | 0.6 | 64 | 26.5 | 5.5 |
| 5 | 91.4 | 62.6 | 21.6 | 3.8 | Defatted cocoa (2) | 0.55 | 63.8 | 25.6 | 5.8 |

Example 2

A solution of glucose syrup in full-cream milk at the same concentration as in Example 1 was evaporated. A sweetened fresh milk evaporated mixture was thus obtained containing, by weight, water 23.6%, carbohydrates 68%, proteins 4% and fats 4.5%.

Example 4

The procedure of Example 3 was followed except for the following difference: the flavoring agent was added after whipping into the whipper when the foam had gained its final texture around 30° C., but after slowing the whipper not to break the foam.

The operational parameters and the results are gathered in Table 2 hereafter.

TABLE 2

| Exp. No. | Evaporated milk content in (g) | | | | Flavor (g) | Foam | | | | |
|---|---|---|---|---|---|---|---|---|---|---|
| | (g) | sugar | water | proteins | | d | sugar | water | proteins | fats |
| 1 | 90.75 | 62.13 | 21.5 | 3.7 | Instant coffee NESCAFE (2.5) | 0.60 | 63.4 | 25.5 | 5 | |
| 2 | 90.4 | 61.9 | 21.4 | 3.7 | Cocoa POULAIN (3) | 0.60 | 62.4 | 25.4 | 5.8 | |
| 3 | 85.8 | 60 | 20.3 | 3.6 | Whiskey (4) Anh. butter (4) | 0.71 | 60 | 24.3 | 5.2 | 4 |
| 4 | 86.8 | 60.75 | 20.6 | 3.6 | Cocoa POULAIN (3) Cocoa butter (4) | 0.75 | 61 | 24.6 | 5.2 | 4 |
| 5 | 86.8 | — | — | — | Whiskey BALLANTINE (3) | 0.70 | 60 | 25.5 | 4 | 4.5 |

TABLE 2-continued

| | | Evaporated milk | | | | | Foam | | | | |
| | | content in (g) | | | | | content in % | | | |
| Exp. No. | (g) | sugar | water | pro-teins | Flavor (g) | d | sugar | water | pro-teins | fats |
|---|---|---|---|---|---|---|---|---|---|---|
| | | | | | Anh. butter (4) | | | | | |

Example 5

Glucose syrup (concentration 70%, ISOSWEET, 803.6 g) was added to 1.125 l (1156 g) of full-cream milk and the solution was subjected to evaporation under 5–10 Torr/40° C. The amount of water removed was about 1100 g and the concentrate gave about 900 g of sweetened, evaporated milk with the following composition by weight: water 23.57%, carbohydrates 67.87%; proteins 3.96%; fats 4.55%.

Portions of this evaporated milk were selected and, at 70%; gellifying polymers were added thereto in quantities indicated in Table 3 hereafter: then, after cooling to 50° C., flavoring agents were added (see Table 3).

Then, using the technique disclosed in Example 2, portions of 5 g of foam obtained by whipping a 20% by weight aqueous albumin solution were added to the selected portions. The operating parameters and the density of the foam samples are given in Table 3.

TABLE 3

| Exp. No. | Evaporated milk (g) | Gellifying polymer (g) | Na Citrate (g) | Flavoring Agent (g) | foam (d) |
|---|---|---|---|---|---|
| 1 | 88.4 | gelatin (0.3) pectin (0.3) SATIAGUM 118/S | — | Hazelnut cream (5) | 0.70 |
| 2 | 89.6 | gelatine (0.3) SATIAGUM (0.3) | — | Orange (5) | 0.74 |
| 3 | 90.75 | gelatin (1.4) SATIAGUM (0.2) | 0.15 | Instant coffee MAXWELL HOUSE (2.5) | 0.70 |
| 4 | 91.65 | gelatin (0.4) SATIAGUM (0.3) | 0.15 | coffee (2.5) | 0.80 |
| 5 | 90.91 | gelatin (0.3) SATIAGUM (0.3) | — | cocoa (3) | 0.70 |

The "fresh milk" foams flavored as described hereabove were used to make fondants with chocolate wrapping (a 50:50 mixture of milk chocolate and black chocolate). These fondants were graded as excellent by confectionery specialists.

Example 6

An evaporated full-cream milk was prepared, as in the foregoing Examples, by subjecting to evaporation a mixture of 1152 g of milk, 404 g of glucose syrup (70%, ISOSWEET) and 404 of aqueous sorbitol syrup (67% by weight) under a pressure of about 5–10 Torr in a Rotavapor heated to about 40° C. The obtained evaporated milk (927 g) contains the following ingredients, by weight: carbohydrates 65.65%; water 25.61%; proteins 3.88%; fats 4.49%.

A hazelnut flavored foam of fresh milk was prepared, exactly as disclosed in Example 5, from 88.41 g of the evaporated milk, 0.3 g of gelatin, 0.3 g of pectin (SATIAGUM 118/5), 5 g of hazelnut cream and 5 g of whipped, 20% by weight, albumin solution. The foam obtained accordingly had a density of 0.74 kg/liter and the composition: sugars 59.54%; water 27.63; proteins 4.56%; fatty substances 5.57%.

Identically, a foam was prepared from: evaporated milk 89.61 g; gelatin 260 0.3 g; SATIAGUM 118/5 0.3 g; apricot preserve 5 g; 20% aqueous albumin, whipped 5 g. This foam had an excellent taste, a density of 0.72 and the following composition: sugars 62.8%; water 28.54%; proteins 4.43%, fats 4.02%.

Example 7

Full-cream milk (1155 g) was used and mixed with 754 g of a commercial 50:50 glucose/fructose syrup containing 566 g of solids (347 g of glucose at 81.5% and 407.2 g of fructose at 69.5%). This mixture was evaporated under vacuum to a remaining 928 g. The composition by weight of this evaporated milk was: carbohydrates 66.93%; water 24.74%; proteins 3.88%; fats 4.48%.

Starting with this evaporated milk, two fresh milk foams were prepared which were flavored with chocolate and coffee respectively. The procedure was exactly the same as of the previous Example, with the terminal addition of 5 g of 20% egg-white foam.

Composition (1):

Evaporated milk 91.41 g; gelatin 260 0.3 g; SATIAGUM 118/5 0.3 g; chocolate 2 g. Final density 0.75.

Composition (2):

Evaporated milk 91.21 g; gelatin 0.3 g: SATIAGUM 0.3 g; sodium citrate 0.2 g; instant coffee 2 g; final density 0.7.

It is noted that if about 0.03% of agar is incorporated to the milk before evaporation, very favorable results are obtained.

We claim:

1. An aerated food product in the form of a foam made from new milk, comprising, as a homogeneous mixture:

raw milk freshly evaporated under reduced pressure;
    about 50 to 75 percent by weight of at least one sweetening and/or preserving additive which is a carbohydrate or polyol;
    at least one hydrophilic, antisyneretic, gellifying polymer;
    at least one flavoring ingredient or composition; and
    a foaming agent; the amount of milk being such that the whole product is a consistent, non-viscous foam mass containing, dispersed therein, microbubbles of air or of an inert gas, and having a density, water activity $a_w$ and water content (by weight) which do not exceed 0.75, 0.80 and 30%, respectively.

2. Food product according to claim 1, wherein the carbohydrates are selected from mono-, poly- and oligo-saccharides; and the polyols are selected from sorbitol, mannitol, propylene glycol, and glycerol.

3. Food product according to claim 1, wherein the polymer is selected from gelatin, agar, dextran, xanthan, carrageenates, alginates, gum guar, and gum arabic.

4. Food product according to claim 1, wherein the flavoring ingredient or composition is selected from fruit, ground seeds, chocolate, coffee, toffee, fruit distillates, marmalades, spirits of brandy, cognac, whiskey, and rum.

5. Food product according to claim 1, wherein the foaming agent is an aqueous albumin solution.

6. Food product according to claim 1, further containing at least one mineral salt selected from alkali salts of the acids phosphoric, citric, sorbic, tartaric, malic and lactic.

7. Food product according to claim 1, wherein the product contains the following percents by weight: 50-70% of carbohydrate; 0.5-3% of polymer; 0.5-5% of foaming agent and 0.5 to 10% of at least one flavoring ingredient or composition.

8. Food product according to claim 1, further containing 0.5 to 5% by weight of at least one fat.

9. Method for preparing an aerated food product according to claim 1, comprising:
dissolving sweetening and/or preserving additive into raw milk and subjecting this solution to evaporation under reduced pressure until the water content is 10-30% by weight to produce a concentrated solution, the temperature not exceeding 60° C., followed by the addition of polymer to the concentrated solution at a temperature between 50° and 80° C.; and
incorporating foaming agent into the concentrated solution, so as to convert the concentrated solution into a foam.

10. Method for preparing an aerated food product according to claim 1, comprising:
dissolving preserving and/or sweetening additive into skimmed raw milk and subjecting this solution to evaporation under reduced pressure without exceeding 60° C. until the water content is 20-30% by weight;
adding gellifying polymer and flavoring ingredient or composition at a temperature between 50° and 80° C.;
adding foaming agent at 80° C. and whipping the mixture vigorously in the presence of air or an inert gas, withdrawing the heating source to produce a stable foam whose density does not exceed 0.75.

11. Method for preparing an aerated food product according to claim 1, comprising:
dissolving preserving and/or sweetening additive into skimmed raw milk and subjecting this solution to evaporation under reduced pressure without exceeding 60° C. until the water content is 20-30% by weight;
adding gellifying polymer at a temperature between 50° and 80° C.;
adding foaming agent at 80° C. and, after withdrawing the heat source, whipping the resulting blend vigorously, in the presence of air or an inert gas, to cool the blend and convert it into a stable foam of a density below 0.75; and
adding flavoring ingredient or composition at a temperature between 20° and 30° C.

12. Method for preparing an aerated food product according to claim 1, comprising:
dissolving preserving and/or sweetening additive into whole raw milk and subjecting this solution to evaporation under reduced pressure without exceeding 60° C. until the water content is 20-30% by weight;
adding gellifying polymer and flavoring ingredient or composition at a temperature between 50° and 70° C. to produce a concentrated solution;
whipping an aqueous solution of egg albumin as a foaming agent into a foam in the presence of air or an inert gas, and blending the whipped albumin with the concentrated solution by mutually contacting the albumin and concentrated solution and imparting thereto laminar non-turbulent motions so that they progressively combine together into an aerated, homogeneous blend whose structure is stabilized by the coagulation of albumin.

13. Method according to claim wherein the foam of the foaming agent is incorporated into the concentrated solution by the steps of:
forming a first stream s of said solution and a second stream m of said foam;
placing these two streams side-by-side so that they flow linearly in the same direction such as to achieve a single flow ms with the two adjoining streams m and s juxtaposed;
dividing this flow, approximately transversally to the junction area of the two components, into two independent streams $(ms)_1$ and $(ms)_2$, each of which comprise a portion of component m and a portion of component s;
modifying the shape and the orientation of the streams relative to each other by interposing helical baffles in the path of the streams and again bringing the streams together laminarly into a single flow, the modifications imposed by the baffles leading essentially to the contacting of the component m of $(ms)_1$ with component s of $(ms)_2$, and conversely, so as to achieve an approximately tetraphase stream $msms = (ms)^2$;
repeating the splitting, reorienting and juxtapositioning of the streams until a composite stream, macroscopically homogeneous $msms \ldots ms = (ms)^n$ is obtained, n not being below 12.

14. Method according to claim 11, wherein fat is added after conversion to a stable foam.

15. Method according to claim 12, wherein the foam of the foaming agent is incorporated into the concentrated solution by the steps of:
forming a first stream s of said solution and a second stream m of said foam;
placing these two streams side-by-side so that they flow linearly in the same direction such as to achieve a single flow ms with the two adjoining streams m and s juxtaposed;
dividing this flow, approximately transversally to the junction area of the two components, into two independent streams $(ms)_1$ and $(ms)_2$, each of which comprise a portion of component m and a portion of component s;
modifying the shape and the orientation of the streams relative to each other by interposing helical baffles in the path of the streams and again bringing the streams together laminarly into a single flow, the modifications imposed by the baffles leading essentially to the contacting of the component m of $(ms)_1$ with component s of $(ms)_2$, and conversely, so as to achieve an approximately tetraphase stream $msms=(ms)^2$;

repeating the splitting, reorienting and juxtapositioning of the streams until a composite stream, macroscopically homogeneous $msms \ldots ms=(ms)^n$ is obtained, n not being below 12.

16. Food product according to claim 2, wherein the carbohydrate is glucose, fructose, galactose, mannose, lactose, saccharose or maltose.

17. Method according to claim 9, wherein flavoring ingredient or composition is added to the concentrated solution before incorporation of the foaming agent.

18. Method according to claim 9, wherein flavoring ingredient or composition is added to the concentrated solution after incorporation of the foaming agent.

19. Method according to claim 9, wherein the foaming agent is whipped before incorporation.

20. Method according to claim 9 wherein the foaming agent is whipped after incorporation.

* * * * *